United States Patent [19]

Bitsch

[11] Patent Number: 4,665,104

[45] Date of Patent: May 12, 1987

[54] FOAMABLE SYNTHETIC RESIN COMPOSITIONS

[75] Inventor: Willy Bitsch, Weiterstadt, Fed. Rep. of Germany

[73] Assignee: Röhm GmbH, Darmstadt, Fed. Rep. of Germany

[21] Appl. No.: 862,474

[22] Filed: May 12, 1986

[30] Foreign Application Priority Data

May 25, 1985 [DE] Fed. Rep. of Germany ....... 3519005

[51] Int. Cl.$^4$ ............................................. C08J 9/14
[52] U.S. Cl. ................................... 521/117; 521/128; 521/149; 521/153; 521/910; 264/DIG. 5
[58] Field of Search ............. 521/117, 128, 149, 153, 521/910; 264/DIG. 5

[56] References Cited

U.S. PATENT DOCUMENTS

| | | | |
|---|---|---|---|
| 3,627,711 | 12/1971 | Schroeder et al. | 521/149 |
| 3,734,870 | 5/1973 | Schroeder et al. | 521/149 |
| 4,139,685 | 2/1979 | Schroeder | 521/88 |
| 4,187,353 | 2/1980 | Schroeder | 521/149 |

OTHER PUBLICATIONS

Chem. Abstr. 77, 21066f.

*Primary Examiner*—Morton Foelak
*Attorney, Agent, or Firm*—Curtis, Morris & Safford

[57] ABSTRACT

A foamed polymethacrylimide resin having improved creep resistance at high temperature and reduced moisture absorption is obtained by heating a foamable resin composition consisting of (1) a copolymer formed between 47 to 53 percent by weight of methacrylonitrile monomer, 53 to 47 percent by weight of methacrylic acid monomer, and 0.01 to 4 percent, by weight of said monomers, of a metal salt of acrylic or methacrylic acid, and (2) 0.5 to 4 percent, also by weight of the monomers, of a blowing agent mixture of formamide or monomethyl formamide and a monohydric aliphatic alcohol having from 3 to 8 carbon atoms in the molecule.

3 Claims, No Drawings

FOAMABLE SYNTHETIC RESIN COMPOSITIONS

The present invention relates to a foamable synthetic resin composition which can be converted by heating into a foamed polymethacrylimide foamed resin, to methods for foaming such a composition to give a foamed resin, and to such a foamed resin.

Foamed polymethacrylimide resins are known. According to German Pat. No. 1,817,156 (=U.S. Pat. No. 3,627,771), they are produced by heating a foamable resin consisting of a polymer containing at least 20 weight percent of units of acrylic or methacrylic acid, and usually units of acrylonitrile or methacrylonitrile, and further containing formamide. The formamide has a triple function: during polymerization, it prevents precipitation of the polymer, which would result in inhomogeneities and impair foaming; upon heating, it decomposes with evolution of propellant gases and causes foaming; and at the same time on heating, ammonia is formed which converts excess acrylic or methacrylic acid units to methacrylimide groups.

From German Pat. No. 2,047,096 (=C.A. 77:21066f) it is known that foamed polymethacrylimide resins produced with formamide will absorb considerable amounts of water in humid atmospheres if, upon decomposition of the formamide, more ammonia is formed than is bound through the formation of imide groups. This patent therefore proposes that only as much formamide be used as can be bound by imide groups and that, if more homogenizing or foaming additives are needed, formic acid be employed in place of formamide.

From this teaching it follows that formamide should not be used as a blowing agent in the production of foamable plastics which cannot absorb ammonia with formation of imide groups. This applies, for example, to foamable plastics having a stoichiometric excess of nitrile groups over carboxyl groups, in other words to copolymers comprising more than 44 weight percent of methacrylonitrile and less than 56 weight percent of methacrylic acid.

In published German Patent Application DOS No. 27 26 259 (=U.S. Pat. No. 4,139,685), aliphatic alcohols having from 3 to 8 carbon atoms are used as blowing agents for foamable synthetic resins composed of methacrylic acid and methacrylonitrile units in a molar ratio from 2:3 to 3:2. Like formamide, the alcohols prevent precipitation of the polymer during polymerization. However, they result in higher foam densities than does formamide. The density can be increased somewhat further by the addition of metal salts of acrylic or methacrylic acid according to German Pat. No. 2,726,260 (=U.S. Pat. No. 4,187,353).

Foamed polymethacrylimide resins are sold in various qualities and density grades under the trademark "ROHACELL". The polymethacrylimide foam resins exhibiting the best creep behavior are designated "ROHACELL WF". They obtain optimum creep properties only after prolonged heating and must then be processed at once since their creep resistance decreases rapidly as water is absorbed.

The present invention has as its object to provide an improved foamed polymethacrylimide synthetic resin which is distinguished by a good creep behavior at high temperatures, which behavior changes only slightly on storage in a humid atmosphere. By creep is meant the gradual reduction in volume of the foamed plastic at high temperature under stress. In the production of laminates with a foamed resin core and heat cured top layers, the foamed resin is subjected to considerable thermal and compressive stresses and under these conditions should creep as little as possible. The requirements which the creep resistance of polymethacrylimide foamed resins must meet become more stringent with increasing density. For example, a foamed resin test specimen measuring $50 \times 50 \times 25$ mm having a density of 70 kg/m$^2$ should not be compressed more than 1 mm in 2.5 hours at 180° C. under a load of 0.35 N/mm$^2$. In the case of a foamed resin having a density from 110 to 120 kg/m$^3$, the same creep resistance is required at a load of 0.7 N/mm$^2$. The creep resistance should not drop below this level even after storage for 14 days in a humid atmosphere (50 percent relative humidity).

It has now been found that foamed polymethacrylimide resins possessing the desired properties can be obtained by heating a resin which is a copolymer formed between 47 to 53 percent by weight of methacrylonitrile monomer, from 53 to 47 percent by weight of methacrylic acid monomer, and from 0.01 to 4 percent, by weight of said monomers, of a metal salt of acrylic and/or methacrylic acid, together with from 0.5 to 4 percent, also by weight of said monomers, of a blowing agent mixture of formamide or monomethyl formamide and a monohydric aliphatic alcohol having from 3 to 8 carbon atoms in the molecule, to temperatures of from 200° C. to 240° C.

This composition of the foamable resin is critical. If less than 47 weight percent of methacrylonitrile is used in its production, then more than 4 percent of blowing agent will be needed to obtain a homogeneous foamable material. If the amount of methacrylonitrile exceeds 53 weight percent, the foamed resin becomes dark and brittle, probably as a result of polymerization of the nitrile groups. Only over the narrow range which corresponds to a stoichiometric excess of between 13 and 45 percent of the nitrile groups over the carboxyl groups will 4 percent or less of blowing agent result in a homogeneous foamable material that yields high quality foamed resins having the requisite density. If formamide alone is used as blowing agent, an undesirable fine-pored foam having poor processing characteristics will be obtained. Aliphatic alcohols used alone result upon heating in products with a coarse spongy structure which cannot be used as foamed resins. Only the mixture of the two blowing agents in combination with the metal salt additive will yield the desired resin foam structure. However, if the 4 percent limit for the blowing agent additive is exceeded, the resulting foamed resin will have a density less than 50 kg/m$^3$ that will not possess the requisite creep resistance.

In comparison with foamed resins sold under the trademark "ROHACELL WF" having densities of 70 and 110 kg/m$^3$, the foamed resin producible in accordance with the invention has remarkably improved creep resistance and reduced sensitivity to moisture. The latter property manifests itself directly through changes in creep behavior in a humid atmosphere and indirectly through the water absorption upon storage in water.

A comparison of foamed plastics producible in accordance with Example 1 and commercial foamed plastics follows.

| | Foamed plastic |
|---|---|

|  | Foamed plastic producible in accordance with the invention (Example 1) | Commercial foamed plastic Rohacell WF |
|---|---|---|
| Density | 120 kg/m³ | 115 kg/m³ |
| Compression in creep test | | |
| (0.7 N/mm², 2.5 hr., 180° C.) | 0.7 mm | >6 mm |
| after tempering (48 hr., 180° C.) | ↓ | 1.05 mm |
| after storage for 15 days | ↓ | ↓ |
| (20° C., 50% rel. hum.) | 0.6 mm | 2.3 mm |

|  | Foamed plastic producible in accordance with the invention (Example 2) | Commercial foamed plastic Rohacell WF |
|---|---|---|
| Density | 70 kg/m³ | 70 kg/m³ |
| Compression in creep test | | |
| (0.35 N/mm², 2.5 hr., 180° C.) | 0.8 mm | >6 mm |
| after tempering (48 hr., 180° C.) | ↓ | 0.9 mm |
| after storage for 15 days | ↓ | ↓ |
| (20° C., 50% rel. hum.) | 0.75 mm | 1.45 mm |
| after storage for 300 days | ↓ | |
| (20° C., 50% rel. hum.) | 1.8 mm | |
| Weight increase during storage in water, 70° C., in % | | |
| after 10 days | 180% | 220% |
| after 50 days | 325% | 460% |
| after 130 days | 440% | 620% |

It is surprising that the foamed resins producible in accordance with the invention exhibit little tendency to absorb water even though they are produced with the addition of excess formamide, which usually results in increased water absorption. The properties of the improved foamed plastic material are such that it can be stored unprotected for a few weeks or months at normal atmospheric humidity and temperature before it is processed into laminates. Heretofore the foamed resin had to be stored with exclusion of air or tempered at least 24 hours at 150° C. to 180° C. shortly prior to processing.

The foamable resin of the invention is obtained conventionally by free radical polymerization of a mixture of the monomers, the blowing agent, and a polymerization initiator, suitably in a flat chamber assembled from parallel plates separated by a peripheral gasket.

As a rule, the monomer mixture will be composed only of methacrylonitrile and methacrylic acid in a weight ratio from 47:53 to 53:47, and preferably from 49:51 to 51:49, and the metal salt. Additional comonomers will result in poorer properties than those desired and therefore are used at most in amounts that will not appreciably detract from the desired properties, preferably less than 6 weight percent of the total weight of polymerizable compounds.

Suitable salts of acrylic or methacrylic acid are those named in U.S. Pat. No. 4,187,353 incorporated herein by reference, and particularly the salts of $Mg^{2+}$, $Zr^{4+}$, $Cr^{3+}$, $Co^{2+}$, $Zn^{2+}$, $cd^{2+}$, $Bi^{3+}$, $TiO^{2+}$, and $Pb^{2+}$. Magnesium methacrylate is preferred. The preferred amount ranges from 0.5 to 2 percent by weight of the polymerizable compounds.

The blowing agent mixture is composed of formamide or monomethyl formamide and an aliphatic alcohol, generally in a weight ratio ranging from 90:10 to 10:90, and preferably from 70:30 to 30:70. Preferably not more than 2.5 percent of the blowing agent mixture, by weight of the polymerizable compounds, is used. The minimum amount is determined by the requirement that the polymer be homogeneous.

Formamide is preferred as the first blowing agent component. Aliphatic alcohols having from 3 to 8 carbon atoms in the molecule which are suited for use as the second component are known from U.S. Pat. No. 4,139,685 incorporated herein by reference. These are preferably secondary or tertiary alcohols, such as isopropanol or tert.-butanol. To initiate the polymerization, the usual free radical forming initiators, such as dibenzoyl peroxide, dilauroyl peroxide, tert.-butyl peroxypivalate or azobisisobutyronitrile, are used in the amounts commonly employed for this purpose. Flame retardants, colorants, mold-release agents, etx., may be used as further additives.

These components are mixed to give a homogeneous liquid and are then polymerized, suitably in a flat chamber whose walls are formed by glass sheets, to give slabs from 10 to 40 mm thick. Their size, in the case of commercial batches, will range from 0.5 to 4 square meters. To assure foamability, the mixture must not become inhomogeneous in the course of polymerization: such inhomogeneity would manifest itself by white spots in the polymer. If inhomogeneities do occur, they can be suppressed by increasing, within the claimed limits on amount, the amount of blowing agent, the amount of formamide in the latter, or the amount of methacrylonitrile.

On being heated to from 200° C. to 240° C., the polymer expands to 5 to 20 times its volume and attains a bulk density between 50 and 250 kg/m³. The foamed resins obtained can be used at service temperatures up to about 180° C. To produce light weight, rigid laminates, fiber mats impregnated with thermosetting resins are applied to both sides of a sheet or plate of foamed resin and the composite is cured in a heated press. The use, as the outer layers, of so-called prepegs, which incorporate glass-fiber or carbon-fiber fabrics and epoxy resins and which at 180° C. and a pressure ranging from about 0.35 to 0.7 N/cm² are permanently bonded to the foamed plastic, is particularly advantageous.

A better understanding of the present invention and of its many advantages will be had by referring to the following specific examples, given by way of illustration.

EXAMPLE 1

A homogeneous mixture of 50 parts by weight (pbw) of methacrylic acid, 50 pbw of methacrylonitrile, 1 pbw of formamide, 1 pbw of isopropyl alcohol, 1 pbw of magnesium methacrylate, and 0.2 pbw of tert.-butyl peroxypivalate is poured into a flat chamber formed by two glass sheets separated by a peripheral gasket and is heated over 70 hours to 40° C. and then over 20 hours to 110° C. A slab of polymer 20 mm thick is so obtained. The slab is expanded by heating over 2 hours to 200° C. to give a polymethacrylimide foamed resin having a density of 120 kg/m³.

Satisfactory results are also obtained using 1.5 pbw of isopropanol with 0.5 pbw of formamide or using 0.2 pbw of isopropanol and 1.8 pbw of formamide.

EXAMPLE 2

The same procedure is followed as in Example 1, except that the polymer slab is heated to 230° C. for expansion. A foamed resin having a density of 70 kg/m³ is so obtained.

EXAMPLE 3

A homogeneous mixture of 50 pbw of methacrylic acid, 50 pbw of methacrylonitrile, 2.5 pbw of formamide, 2 pbw of 2-ethyl-1-hexanol, 0.8 pbw of magnesium methacrylate, and 0.2 pbw of tert.-butyl peroxypivalate is polymerized in a flat chamber over 48 hours at a temperature rising slowly from 45° C. to 120° C. to give a slab 20 mm thick.

Sections of such a slab were heated for three hours and yielded foamed plastics having the following densities:

| Temperature heated to (°C.) | Density (kg/m³) |
| --- | --- |
| 205 | 157 |
| 210 | 128 |
| 215 | 102 |

Similar results can be obtained using methylformamide instead of formamide.

I claim:

1. A foamable synthetic resin composition consisting of (1) a copolymer formed from 47 to 53 weight percent of methacrylonitrile monomer, from 53 to 47 weight percent of methacrylic acid monomer, and from 0.01 to 4 percent, by weight of said monomers, of a metal salt of acrylic and/or methacrylic acid, and (2) from 0.5 to 4 percent, by weight of said monomers, of a blowing agent mixture of formamide or monomethyl formamide and a monohydric aliphatic alcohol having from 3 to 8 carbon atoms in the molecule in a ratio of 10:90.

2. A foamable resin composition as in claim 1 wherein said metal salt is magnesium methacrylate.

3. The method of foaming a composition as in claim 1 which comprises heating said composition at a temperature from 200° C. to 240° C.

* * * * *